Patented Dec. 1, 1931

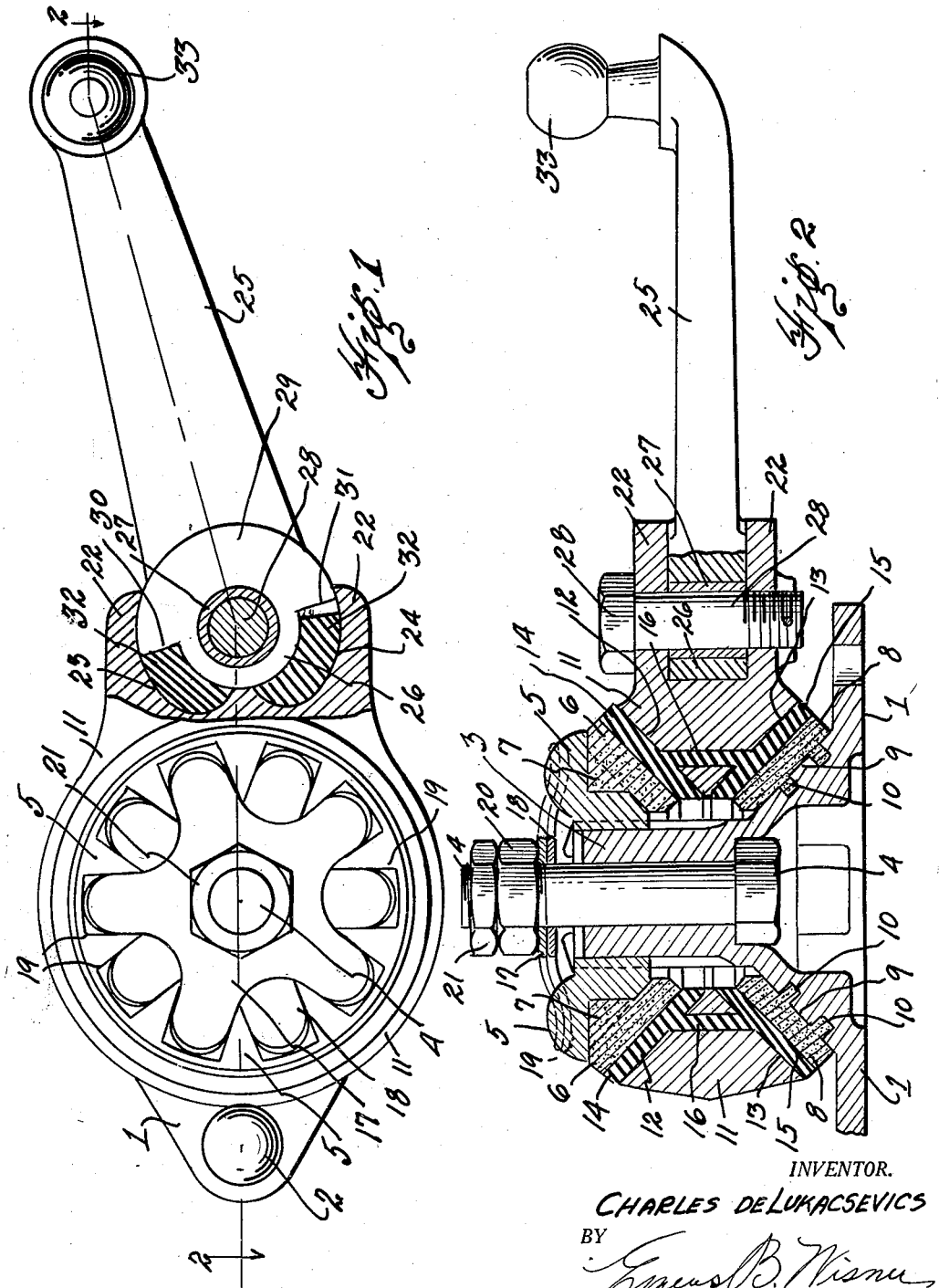

1,834,446

UNITED STATES PATENT OFFICE

CHARLES DE LUKACSEVICS, OF DETROIT, MICHIGAN, ASSIGNOR TO LILIAN BYRNE, OF DETROIT, MICHIGAN

SHOCK ABSORBER

Application filed August 30, 1929. Serial No. 389,579.

This invention relates to shock absorbers and the object of the invention is to provide a shock absorber of the friction type in which the friction is adjustable to adjust the shock absorber to the load.

Another object of the invention is to provide a shock absorber of the character described having a yieldable arm for connection to the automobile axle and yieldable under an upward or downward movement of the said axle.

A further object of the invention is to provide a shock absorber in which a shock first moves the shock absorber arm and then moves the shock absorber mechanism by means of the arm.

Another object of the invention is to provide a shock absorber comprising conical friction faces riding in constant surface contact and provided with an adjustable spring tension for accommodating the shock absorber to the load.

A further object of the invention is to provide an arm having a yieldable connection with the movable part of the shock absorber mechanism, the said yieldable connection being arranged to increasingly resist movement of the arm as it is moved in relation to the shock absorber proper.

These objects and the several novel features of the invention are hereinafter more fully described and claimed and the preferred form of construction by which these objects are attained is shown in the accompanying drawings in which—

Fig. 1 is an elevation of a shock absorber embodying my invention, partly broken away to show the construction.

Fig. 2 is a section taken on line 2—2 of Fig. 1.

As shown in Fig. 2 the device comprises a base plate 1 apertured to receive attaching bolts 2, one of which is shown in Fig. 1, by which the base plate is secured to an automobile chassis. The base plate 1 is provided with a hub 3 having a central aperture for the bolt 4. This hub is splined on the exterior to receive a member 5 which is movable longitudinally of the splined hub. A conical friction face 6 is secured to the member 5 and is provided with lugs 7 fitting companion recesses in the member 5 whereby the friction face 6 is secured to the member 5. A similar friction face 8 is secured to the conical face 9 of the base plate 1 by the lugs 10 which extend into recesses in the base plate 1.

The movable part of the shock absorber comprises an annular member 11 having opposite conical faces 12 and 13. A conical friction face 14 is provided for the face 12 and a conical friction face 15 is provided for the face 13 of the annular member 11. These friction faces 14 and 15 are connected by several portions 16 moulded in apertures in the annular member 11 when the friction faces 14 and 15 are moulded thereon. In order to place a tension on the friction faces a pair of spring steel members 17 and 18 are positioned over the upper end of the bolt 4. Each of these members is provided with a series of spring fingers fitting in notches 19 provided therefor in the member 5 as shown in Fig. 1.

The tension of these springs is adjustable by means of the nut 20 on the bolt 4 and a lock nut 21 is provided on the bolt 4 to lock the nut 20 in position. These springs 17 and 18 force the member 5 toward the base plate 1 thus producing frictional contact between the conical friction face 6 and the companion friction face 14, and between the friction face 8 and the companion friction face 15. By this arrangement turning of the member 11 in relation to the base plate and member 5 is frictionally resisted and the frictional resistance is adjustable by varying the tension of the springs 17 and 18 by means of the nut 20.

The member 11 is provided with an extension 22 at one side thereof and this extension 22 is provided with a recess forming two pockets or chambers 23 and 24. An arm 25 is provided having a hub 26 in which a bushing 27 is mounted and a bolt 28 is inserted through the extension 22 and through the bushing 27. The arm 25 is provided with a semi-circular portion 29 at the hub terminating in two radial shoulders 30 and 31 which form the limits of the pockets or chambers 23 and 24. An elastic member 32 such as rubber or similar material is positioned in each chamber 23 and 24 and these elastic members 32 yieldably resist turning of the arm 25 on the bolt 28 in either direction. As these elastic members 32 practically fill the chambers 23 and 24 and as these chambers are reduced in area by turning the arm 25 in either direction, the elastic members will increasingly resist turning of said arm until the arm 25 carries the member 11 with it against the resistance of the friction faces in the shock absorber.

It will thus be seen that minor shocks will be absorbed by the resilient action of the arm 25, which is usually connected by a link (not here shown) attached at one end to the ball end 33 of the arm 25 and attached at the opposite end to the automobile axle.

In the case of heavier shocks the initial yielding movement of the arm 25 overcomes the inertia of the movable member 11 and the arm thus picks up the member 11 thus building up resistance against the shock. It is also to be noted that the action of the shock absorber is the same in either direction and by means of the nut 20 the shock absorber may be adjusted to the load on the wheel adjacent to the shock absorber.

In the form of the device shown in Fig. 2 the friction face 6 is formed of a hard ceramic material having a very high coefficient of friction and having lugs 7 fitting in recesses in the member 5 so that this conical friction face is interchangeable with other friction faces of the same shape. The friction face 8 is made of the same material and is provided with lugs 10 for insertion in companion recesses in the base plate 1 so that this friction face is also interchangeable with other friction faces of the same shape. The friction faces 14 and 15 shown in Fig. 2 are of a tough rubber which has been vulcanized to a point where it is nearly non-elastic and these friction faces 14 and 15 are moulded onto the member 11 and also into the apertures in the member 11 as shown at 16 in Fig. 2.

These faces when formed of vulcanized rubber are not interchangeable due to the fact that they are moulded onto the member 11. These faces may also be made of hard ceramic material similar to the faces 6 and 8 in which case they are provided with lugs fitting the apertures in the member 11 and are interchangeable with other friction faces of the same shape. It will thus be seen that the stationary and movable friction faces may be all made of hard ceramic material, or one set of faces may be vulcanized rubber and the other set may be hard ceramic material or all friction faces may be made of vulcanized rubber in which case the faces are not interchangeable but are moulded onto the respective members.

From the foregoing description it becomes evident that the device is very simple and efficient in operation, will not easily get out of order, will absorb minor shocks by a light resistance and will absorb heavier shocks by adding to the resistance, and provides a device which accomplishes the objects described.

Having thus fully described my invention, its utility, and mode of operation, what I claim and desire to secure by Letters Patent of the United States is—

1. In a shock absorber, a stationary member adapted to be secured to an automobile chassis and having a pair of hard ceramic friction faces, a movable member pivotally mounted in said stationary member and having a pair of hard ceramic friction faces riding in contact with the friction faces of said stationary member, yieldably adjustable means for holding the friction faces in contact, an extension on one side of said movable member, an arm pivotally mounted in said extension and having a pair of shoulders on opposite sides of its pivot and elastic means mounted in said extension and yieldably engaging said shoulders to resist turning of the arm on its pivot in either direction, the outer end of said arm being adapted for connection to an automobile axle.

2. In a shock absorber, a stationary member adapted to be secured to an automobile chassis and having a pair of interchangeable friction faces, a movable member pivotally mounted in said stationary member and having a pair of interchangeable friction faces riding in contact with the friction faces of said stationary member, an extension on one side of said movable member, an arm pivotally mounted in said extension and having a pair of shoulders arranged on opposite sides of its pivot and elastic means mounted in said extension and yieldably engaging said shoulders.

3. In a shock absorber, a stationary member adapted to be secured to an automobile chassis, a movable member pivotally mounted in said stationary member, friction means resisting turning of the movable member in relation to the stationary member, an extension on one side of the movable member, a pair of recesses formed in said extension, an arm pivotally mounted in said extension, a pair of diametrically opposite shoulders on said arm adapted to reduce the area of either recess by turning of said arm on its pivot and an elastic member positioned in each recess.

4. In a shock absorber, a stationary member adapted to be secured to an automobile chassis and having a pair of friction faces, carried by said member, a movable member pivotally mounted in said stationary member and having a pair of friction faces riding in contact with the friction faces of said stationary member, an extension on one side of said movable member, an arm pivotally mounted in said extension and means engageable by movement of the arm in either direction and yieldably resisting turning of said arm on its pivot in either direction.

5. In a shock absorber, a stationary member having a pair of friction faces, a movable member pivotally mounted in said stationary member and having a pair of friction faces riding in contact with the friction faces of the stationary member, adjustable means for holding the friction faces in contact, an arm pivotally connected to said movable member and means engageable by movement of the arm in either direction and yieldably resisting turning of said arm on its pivot.

6. In a shock absorber, a stationary member, a movable member pivotally mounted in said stationary member, friction means resisting turning of said movable member in relation to the stationary member, an arm pivotally connected to said movable member, a pair of shoulders on said arm adjacent its pivot and yieldable means carried by said movable member and engaging against said shoulders.

7. In a shock absorber, a stationary member, a movable member pivotally mounted in said stationary member, friction means resisting turning of said movable member on its pivot, manually adjustable means for varying the tension on the friction means, an arm pivotally connected to said movable member and yieldable means engageable by the arm and resisting turning of said arm on its pivot in either direction.

8. In a shock absorber, a stationary member, a movable member pivotally mounted in said stationary member, friction means resisting turning of the movable member in relation to the stationary member, an arm pivotally connected to said movable member and yieldable means engageable by the arm and increasingly resisting turning of said arm on its pivot.

In testimony whereof I sign this specification.

CHARLES DE LUKACSEVICS.